US012680533B2

(12) United States Patent
Barbier et al.

(10) Patent No.: US 12,680,533 B2
(45) Date of Patent: Jul. 14, 2026

(54) HYDRAULIC CONTROL CIRCUIT FOR CONTROLLING FAN BLADE PITCH

(71) Applicant: SAFRAN AIRCRAFT ENGINES, Paris (FR)

(72) Inventors: Hugues Barbier, Moissy-Cramayel (FR); Sébastien Oriol, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 137 days.

(21) Appl. No.: 18/721,235

(22) PCT Filed: Dec. 20, 2022

(86) PCT No.: PCT/FR2022/052432
§ 371 (c)(1),
(2) Date: Jun. 18, 2024

(87) PCT Pub. No.: WO2023/118724
PCT Pub. Date: Jun. 29, 2023

(65) Prior Publication Data
US 2025/0084836 A1 Mar. 13, 2025

(30) Foreign Application Priority Data
Dec. 23, 2021 (FR) ....................................... 2114426

(51) Int. Cl.
| B64C 11/38 | (2006.01) |
| F04B 1/324 | (2020.01) |
(Continued)

(52) U.S. Cl.
CPC .............. F04B 1/324 (2013.01); B64C 11/38 (2013.01); F04B 49/08 (2013.01); F01D 7/00 (2013.01); F15B 2211/20546 (2013.01)

(58) Field of Classification Search
CPC ...... F01D 7/00–02; F04B 23/02; F04B 1/295; F04B 1/324; B64C 11/38–42; B64C 11/30–308; F15B 2211/20546
(Continued)

(56) References Cited

U.S. PATENT DOCUMENTS

| 3,486,334 | A | * | 12/1969 | Miller | ................. | F15B 13/0416 |
| | | | | | | 60/452 |
| 6,468,046 | B1 | * | 10/2002 | Du | .......................... | F04B 1/324 |
| | | | | | | 417/222.1 |
(Continued)

FOREIGN PATENT DOCUMENTS

| FR | 2435604 A1 | 4/1980 |
| FR | 2978953 A1 | 2/2013 |
| FR | 3011288 A1 | 4/2015 |

OTHER PUBLICATIONS

International Search Report for PCT/FR2022/052432 dated Apr. 3, 2023.

*Primary Examiner* — Thomas Fink
(74) *Attorney, Agent, or Firm* — McDonald Hopkins LLC

(57) ABSTRACT

A hydraulic control circuit of a double-acting orientation cylinder to orient fan blades of a turbojet engine. The control circuit includes an oil tank, a variable-displacement axial piston pump including a swash plate controlled by a control cylinder comprising a control chamber and by compensation cylinder comprising a compensation chamber. The pump is supplied by the tank and has the outlet thereof connected to one of the chambers of the orientation cylinder, the other chamber of the orientation cylinder being connected to the tank, the control and compensation chambers being pressurised with a pressure corresponding to the pump outlet pressure, the control and compensation chambers being
(Continued)

arranged to increase the tilt of the plate in order to increase the displacement of the pump when the supply pressure of these chambers increases.

9 Claims, 4 Drawing Sheets

(51) Int. Cl.
    *F04B 49/08*           (2006.01)
    *F01D 7/00*            (2006.01)

(58) Field of Classification Search
    USPC .......................................................... 60/452
    See application file for complete search history.

(56) References Cited

U.S. PATENT DOCUMENTS

| | | | |
|---|---|---|---|
| 2003/0077173 A1* | 4/2003 | Franchet ................. | B64C 11/38 |
| | | | 416/30 |
| 2010/0199838 A1 | 8/2010 | Krebs et al. | |
| 2011/0012353 A1* | 1/2011 | Kamata ................... | F03D 80/70 |
| | | | 290/44 |
| 2022/0082104 A1* | 3/2022 | Apperger ............. | F04B 1/2021 |

* cited by examiner

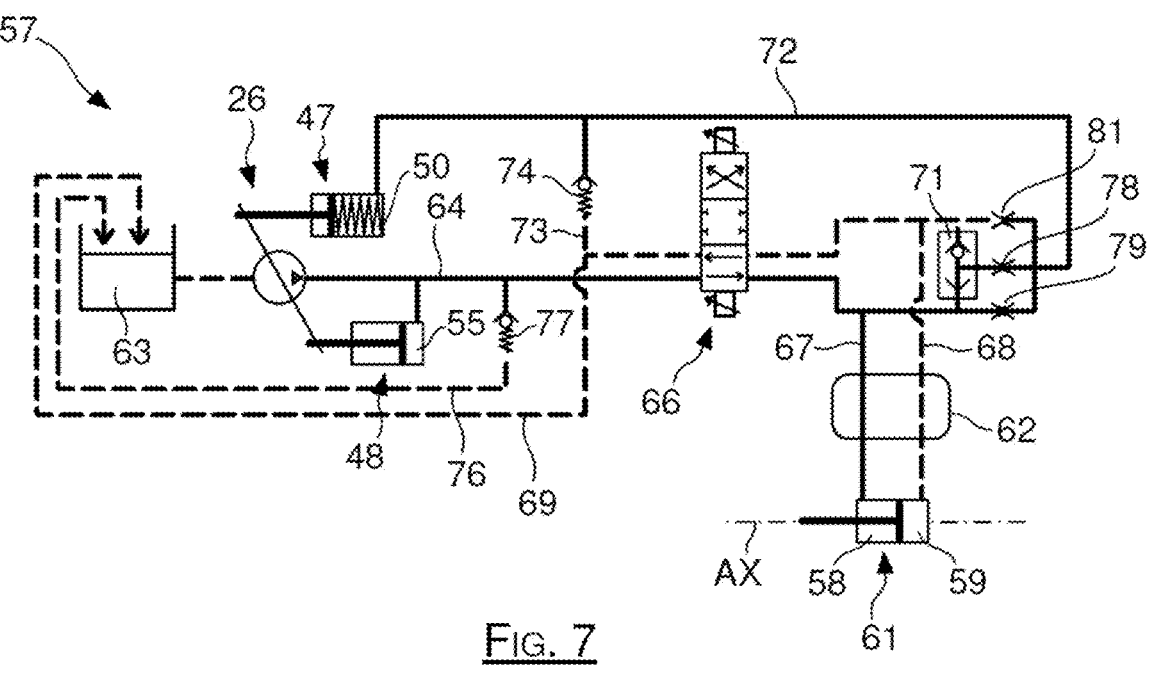
<u>FIG. 7</u>
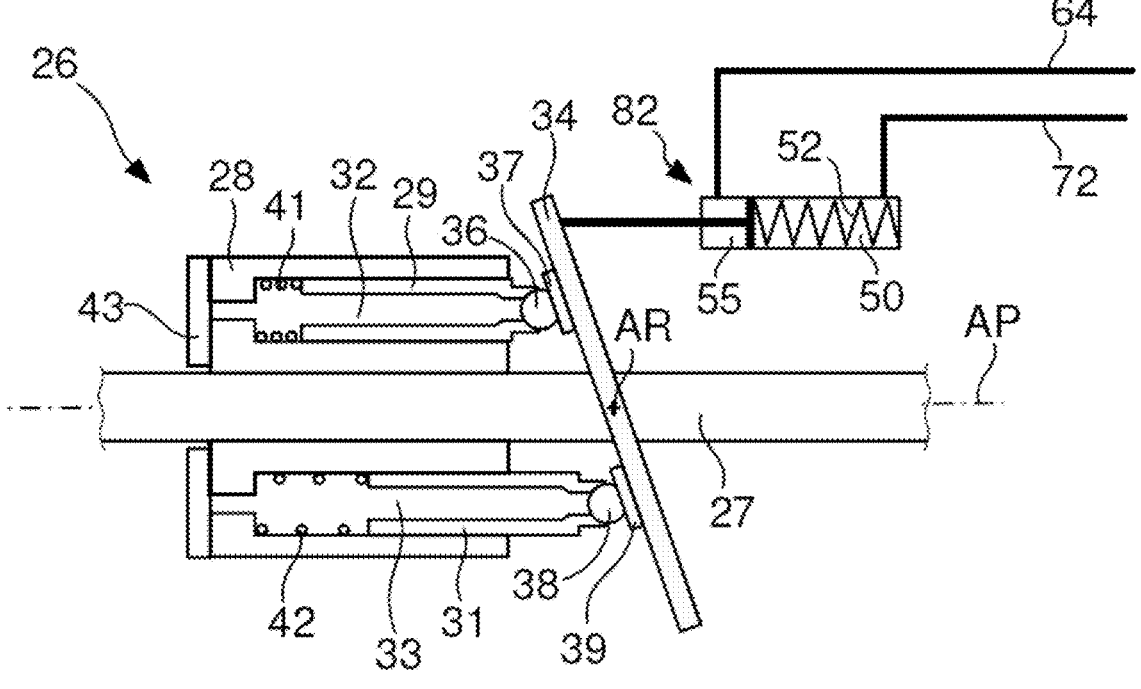
<u>FIG. 8</u>

HYDRAULIC CONTROL CIRCUIT FOR CONTROLLING FAN BLADE PITCH

CROSS-REFERENCE TO RELATED APPLICATIONS

This is the National Stage application of PCT international application PCT/FR2022/052432, filed on Dec. 20, 2022, which claims the priority of French Patent Application No. 2114426, filed Dec. 23, 2021, both of which are incorporated herein by reference in their entireties.

TECHNICAL FIELD

The invention relates to a system comprising a hydraulic control circuit for the setting of turbojet engine fan blades.

PRIOR ART

In a motor (a turbomachine) of the unducted turbojet engine type, such as an "open rotor" with two counter-rotating fans or even of the USF type for "Unducted Single FAN", that is to say with a single fan followed by a non-rotary blading, there is no nacelle surrounding the fan(s). The angle of incidence of the blades of a fan is adjustable by a pitch setting system generally allowing controlling the setting of all the blades at the same angle (the same pitch).

In a turbojet engine type motor, marked by 1 in FIG. 1, the air is admitted into an inlet sleeve 2 to pass through a fan including a series of rotary vanes 3 before splitting into a central primary flow and a secondary flow surrounding the primary flow.

Most current ducted turbojet engines do not comprise a system for varying the angle of incidence of the fan blades, however some studies consider such a system. The ducted turbojet is then of a type commonly referred to as VPF for "Variable Pitch Fan". The following description takes as an example the application of the hydraulic control system to the ducted turbojet engine in FIG. 1, but it is understood that the system can equally apply to an unducted turbojet.

The primary flow of the turbojet engine 1 is compressed by low pressure 4 and high pressure 5 compressors before reaching a combustion chamber 6, after which it expands by passing through a high pressure turbine 7 and a low pressure turbine 8, before being discharged by generating an auxiliary thrust. The secondary flow is, in turn, propelled directly by the fan to generate a main thrust.

Each turbine 7, 8 includes series of blades which are oriented radially and regularly spaced about an axis of rotation AX of the motor, these blades being carried by rotor elements of the motor rotating about the axis AX.

A casing 9 surrounds the vanes 3 of the fan and the entire motor to externally delimit the secondary flow. The vanes 3 of the fan can be of the variable setting type, so that the orientation of the vanes 3 about their respective radial axes can be adjusted for all these vanes. This setting adjustment is controlled depending on the operating conditions of the motor, in particular to optimise the consumption.

As represented schematically in FIG. 2, each vane 3 then includes a base 11 carried by a rotor element 12 rotating about the axis AX, by means of a pivot connection allowing it to pivot about a radial axis relative to the axis AX.

Additionally, a central shaft 13 passing through the rotor element 12 and rotating therewith includes a disc 14 provided with an external circumferential groove 16, and each base 11 includes a stud not represented which is engaged in this groove 16. A movement of the central shaft 13 with the disk 14 which it carries, along the axis AX thus allows longitudinally moving the pin of each base 11 to rotate the vane 3 about its radial axis.

FIG. 2 provides schematically an example of a mechanism among other possibilities that can be implemented, such as connecting rod-crank type systems, so that the setting of the vanes 3 depends on the longitudinal position of the central shaft 13.

Maintaining the shaft 13 at a given longitudinal position is ensured by means of a hydraulic transfer bearing 15 surrounding the shaft 13, by pressurising a first chamber 17 and a second chamber 18 of this bearing 15 at different pressures.

In the example of FIG. 2, the shaft 13 comprises a first internal channel communicating the first chamber 17 with a downstream chamber 21 of a cylinder body 22 carried by the rotor element 12 while being rigidly secured thereto. This shaft 13 also comprises a second internal channel communicating the second chamber 18 with an upstream chamber 19 of the cylinder body 22.

The upstream end of the shaft 13 is housed in the cylinder body 22, and it is terminated by a plate 23 separating the upstream chamber 19 and the downstream chamber 21 of the cylinder body 22.

In operation, the pressure difference between the first chamber 17 and the second chamber 18 is adjusted to correspond to the force exerted by the vanes 3 on the disk 14, so as to maintain the shaft 13 at a given longitudinal position, in order to block the vanes at a given setting value.

From such an balanced situation, a reduction or an increase in the pressure of one or the other of the chambers 17 and 18 allows moving the shaft 13 upstream or downstream to change the setting angle of the blades, before readjusting the changed pressure to restore a balance in order to maintain the vanes at the new setting angle thereof.

As the hydraulic transfer bearing 15 is the seat of leaks, maintaining the blades at a given setting angle requires continually hydraulically supplying the chambers 17 and 18 in order to keep them pressurised at the required pressures.

The pressurisation of chambers 17 and 18 is ensured with a hydraulic pump generating a sufficiently high nominal pressure to allow manoeuvring the blades over their entire range of setting angles. This nominal pressure, which is the highest pressure of the two chambers 17 and 18, thus corresponds to the maximum force that can be exerted by the vanes on the disc 14 according to all possible operating conditions of the motor.

In practice, the continual maintenance of the upstream and downstream chambers at high pressure values, associated with the necessary presence of leaks at the hydraulic transfer bearing, penalises the efficiency of the motor since it corresponds to an additional energy expenditure.

The aim of the invention is to provide a solution for limiting the energy loss of such a hydraulic control system for fan blade setting.

DISCLOSURE OF THE INVENTION

To this end, the invention relates to a hydraulic control circuit of a double-acting orientation cylinder to orient fan blades of a turbojet engine, comprising an oil tank, a variable-displacement axial piston pump comprising a swash plate as well as a control chamber and a compensation chamber, the tilt of the plate being controlled by pressurising these chambers, the pump being supplied by the tank and having the outlet thereof configured to be able to be connected by a supply pipe to one of the chambers of the orientation cylinder, the other chamber of the orientation cylinder being connected to the tank, the control chamber and the compensation chamber both being pressurised with a pressure corresponding to the pump outlet pressure, the control chamber and the compensation chamber being arranged to increase the tilt of the plate in order to increase the displacement of the pump when the pressurisation pressure of these chambers increases.

Thanks to the invention, the pressure delivered by the pump is adjusted to the necessary and sufficient value to counter the forces exerted by the vanes on the double-acting cylinder, which allows significantly reducing the value of this pressure to reduce both the energy consumption of the pump and the hydraulic leaks in the circuit.

The invention also relates to a circuit thus defined, comprising a control cylinder including the control chamber, and a compensation cylinder including the compensation chamber, the control cylinder and the compensation cylinder being distinct.

The invention also relates to a circuit thus defined, comprising a double-acting control and compensation cylinder integrating the control chamber and the compensation chamber.

The invention also relates to a circuit thus defined, wherein the pump has the outlet thereof connected to a dispensing valve via a supply pipe, wherein the compensation chamber of the pump is supplied by the output of the pump, wherein the orientation cylinder has two chambers which are connected to the dispensing valve, wherein the dispensing valve can occupy a position in which it connects one of the chambers to the supply pipe and the other chamber to the tank, or another position in which it connects one of the chamber to the tank and the other chamber to the supply pipe, the circuit further comprising a selection valve connected to the two chambers of the orientation cylinder and to the control cylinder of the pump via a control pipe, to pressurise the control chamber of the pump with the highest pressure among the two chambers of the orientation cylinder.

The invention also relates to a circuit thus defined, wherein the control pipe is connected to the two chambers by additional conduits provided with restrictions, and wherein the dispensing valve can occupy a position in which the pump and the tank are isolated from the chambers of the orientation cylinder.

The invention also relates to a circuit thus defined, comprising a bleed pipe connecting the supply pipe to the tank via a check valve.

The invention also relates to a circuit thus defined, bleed pipe connecting the control pipe to the tank via a check valve.

The invention also relates to a circuit thus defined, in which the control chamber has a larger section than the compensation chamber.

The invention also relates to a circuit thus defined, in which the control chamber incorporates a spring tending to deploy the cylinder.

The invention also relates to a turbojet engine comprising a circuit thus defined and variable-setting fan blades which are controlled by this circuit.

BRIEF DESCRIPTION OF THE DRAWINGS

FIG. 7 is a schematic view of the control circuit according to the invention when the dispensing valve thereof occupies a third position;

FIG. 8 is a longitudinal sectional view of a variable-displacement axial piston pump equipped with a double-acting control and compensation cylinder.

DESCRIPTION OF THE EMBODIMENTS

Figure 1:
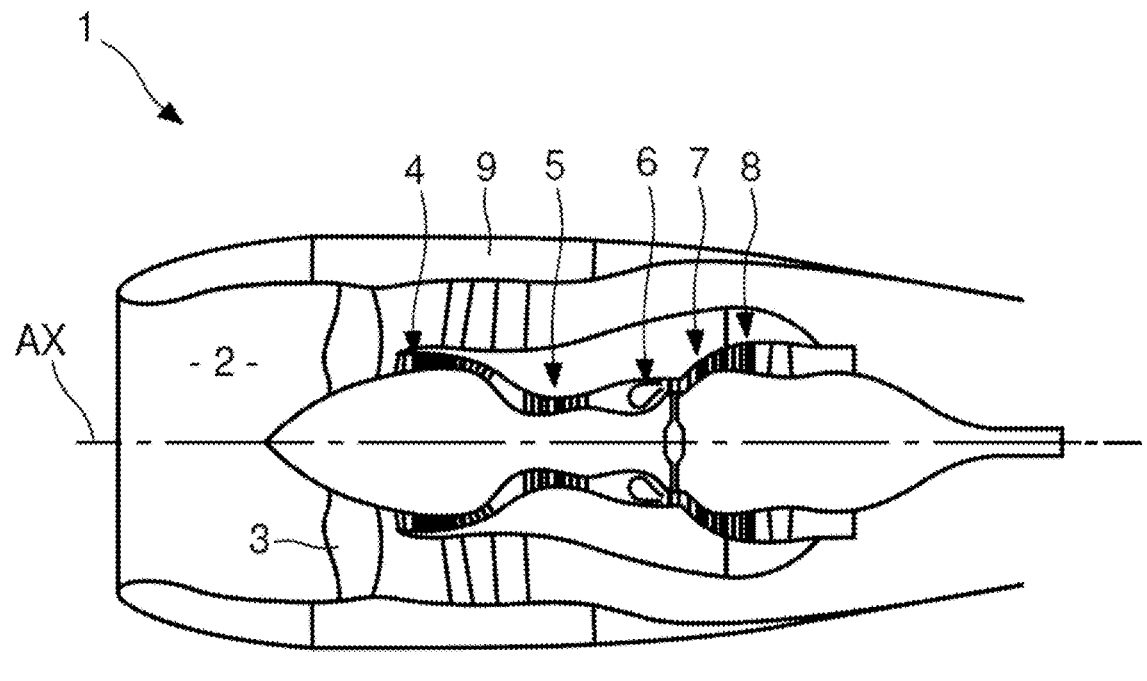
FIG. 1 is a longitudinal sectional view of a known bypass turbojet engine.
Figure 2:
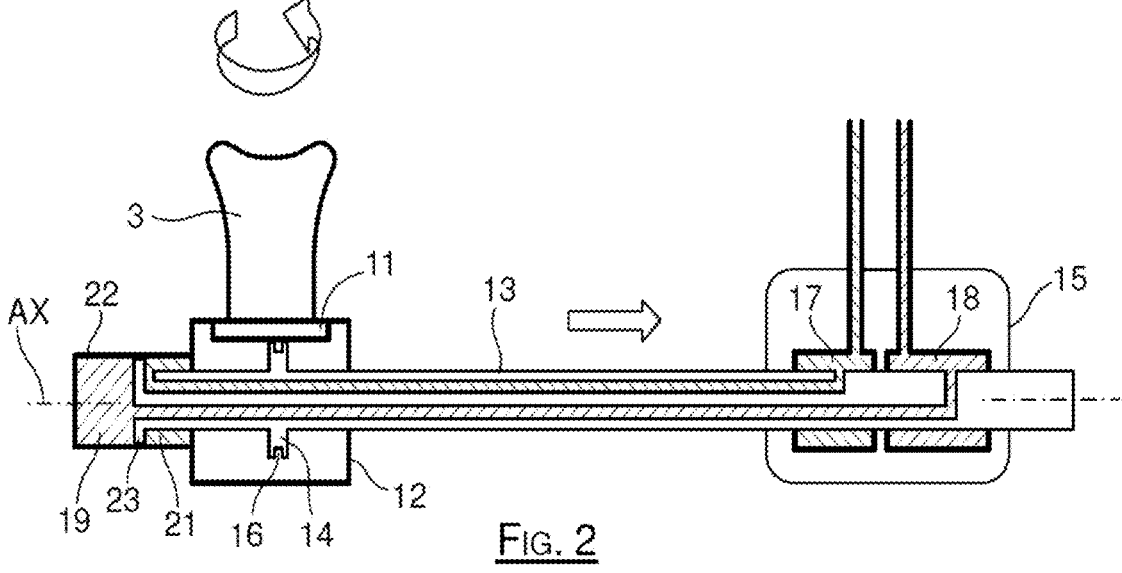
FIG. 2 is a schematic view of a known hydraulic system for adjusting the setting of the fan blades.
Figure 3:
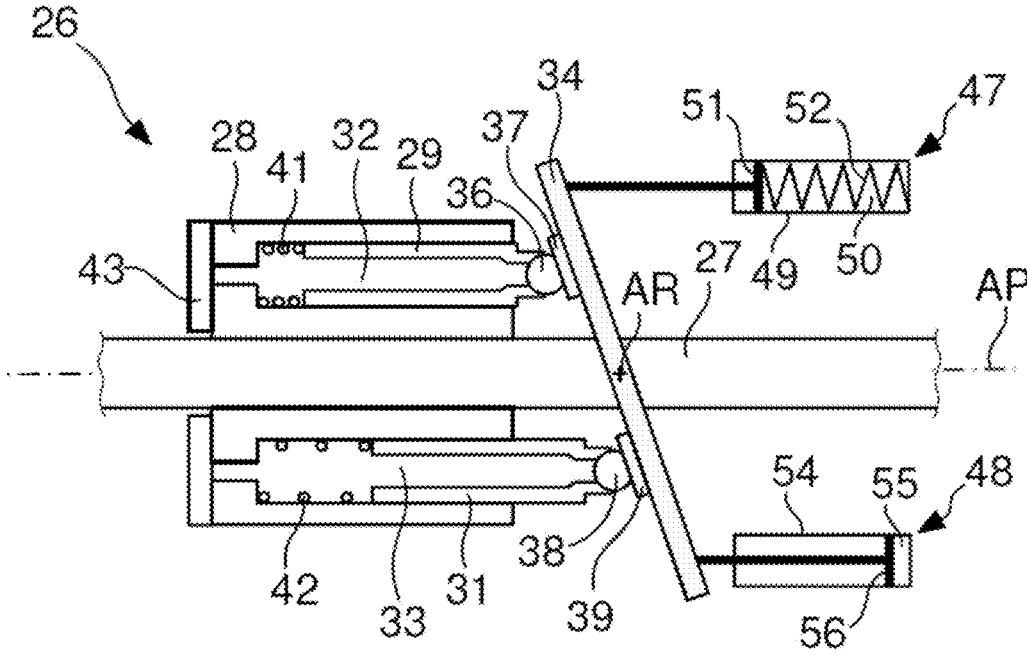
FIG. 3 is a longitudinal sectional view schematically representing a variable-displacement axial piston pump.

In FIG. 3, an axial piston pump 26 includes a drive shaft 27 which is rotated by a shaft of the turbojet engine that this pump equips. This shaft 27 rotates about an axis AP and it carries a barrel 28 to which it is rigidly secured, this barrel here carrying two pistons 29, 31. The piston 29 is slidably mounted in a corresponding cylindrical chamber 32 of the barrel 28 to be movable in translation in this chamber in the direction AP. The piston 31 is, in the same way, slidably mounted in another cylindrical chamber 33 of the barrel 28.

This pump also includes a swash plate 34 which is carried by fixed elements of the pump 26 while being capable of pivoting about an axis of rotation AR normal to the axis AP.

The piston 29 includes a free end protruding from the barrel 28 which is equipped with a ball 36 bearing on the plate 34 via a pad 37. In the same manner, the piston 31 includes a free end equipped with a ball 38 bearing on the plate 34 via another shoe 39.

As shown in FIG. 3, a return spring 41 located in the chamber 32 continually tends to remove the piston 29 from this chamber so that the free end thereof is all the time kept plated on the plate 34. Similarly, another return spring 42 is arranged in the chamber 33 to keep the end of the piston 31 plated on the plate 34.

Figure 4:
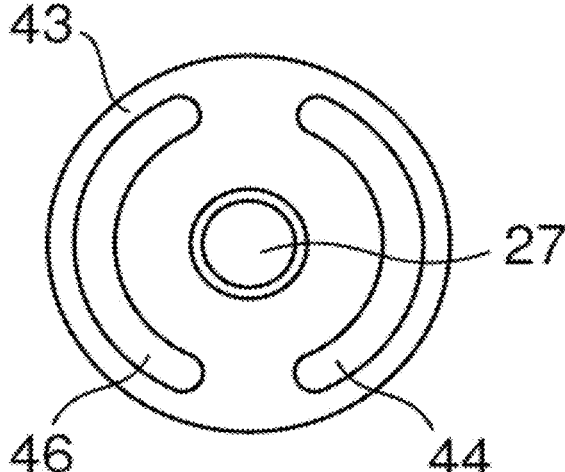
FIG. 4 is a front view of a variable-displacement axial piston pump valve plate.

This pump also includes a valve plate 43 attached to the face of the barrel 28 which is opposite to the pistons along the axis AP. This valve plate 43 which is a fixed element of the pump, and which appears alone in FIG. 4, is crossed by the shaft 27 and includes an oil intake port 44 in the shape of an arc of a circle extending over a little less than half a turn, and an oil discharge port 46 also extending over a little less than a half turn while being disposed diametrically opposite to the intake port 44.

As shown in FIG. 3, each chamber 32, 33 is terminated, on the side opposite to the piston it houses, by a channel passing through the barrel to be able to be communicated with any of the ports 44, 46 of the valve plate 43.

The intake port 44 is connected to a pump supply oil reservoir, at atmospheric pressure, and the discharge port 46 is connected to an outlet conduit of the pump.

In operation, the rotation of the barrel 28 about the axis AP generates an alternating movement of the pistons 29 and 31 whose ends are held bearing on the plate 34. In this movement, each piston extends to suck in oil throughout the phase of rotation where the chamber thereof communicates with the port 44, and it is retracted to discharge pressurised oil through the port 46 throughout the phase where the chamber thereof communicates with this other port 46.

In the example of FIG. 3, only two pistons with their housings are represented, but such a pump 26 generally includes a greater number of axial pistons housed in the barrel thereof, such as for example five, seven or nine pistons.

As shown in FIG. 3, the tilt of the plate 34 conditions the movement stroke of each piston, such that the adjustment of this tilt allows adjusting the displacement of the pump, that is to say its flow rate per barrel revolution.

To this end, the tilt of the plate 34 is adjustable by means of a control cylinder 47 and a compensation cylinder 48 which extend parallel to the axis AP while being disposed in a diametrically opposite manner about this axis AP. The plate 34 is, in turn, tiltably mounted about an unmarked axis which intersects the axis AP while being oriented perpendicular to a plane passing through the axis AP and by the cylinders 47 and 48.

The control cylinder 47 includes a body 49 in which slides a rod terminated by a plate 51 separating this body 49 into two chambers, with a return spring 52 housed in the control chamber marked 50 which is opposite the rod, this spring 52 having one end bearing on the plate and the other end thereof bearing on the bottom of the body 49. This spring 52 continually tends to deploy the cylinder, to bring the rod thereof out of the body, and this rod has the free end thereof bearing on one face of the plate 34.

In the same manner, the cylinder 48 includes a body 54 in which slides a rod terminated by a plate 56 separating the body into two chambers, and the rod thereof bears on one face of the plate 34. The chamber thereof which is opposite to its rod, which constitutes the compensation chamber marked 55, is pressurised by an oil tap exiting the pump 26.

When the pump starts, the chambers 50 and 55 of the cylinders 47 and 48 are not pressurised, but the spring 52 pushes the rod of the cylinder 47 so that it comes out, such that the plate 34 is tilted when the pump starts so that it generates a flow rate.

This flow has the effect of pressurising the compensation cylinder 48 which extends its rod, thus tending to reduce the tilt of the plate. In an antagonistic manner, the control cylinder is pressurised to another pressure value, such that once in service, the pump rotates with a flow rate value, resulting from the tilt of its plate, which is conditioned by the forces exerted by the cylinders 47 and 48 on the plate. When the pump is stopped, the cylinders 47 and 48 are depressurised, and the plate returns to a tilted position due to the return spring 52.

The control cylinder 47 also has the control chamber 50 thereof which is pressurised with a pressure corresponding to the outlet pressure of the pump. It is arranged to exert on the plate 34 a greater torque than the compensation cylinder 48 when they are supplied at the same pressure. This can be obtained with a control cylinder 47 having a larger section than the compensation cylinder 48, or possibly by placing this control cylinder 47 at a greater distance from the axis of rotation AR of the plate 34 than the compensation cylinder 48.

Thus, for the same supply pressure of the control cylinder and the compensation cylinder, the control cylinder exerts a torque on the plate 34 (relative to its axis AR) which is greater than that exerted by the compensation cylinder, such that the plate takes on a certain tilt to which a certain displacement of the pump corresponds.

When the pressure increases at the pump outlet, it also increases in the two cylinders 47 and 48, which increases the difference in the pressing forces exerted on the plate by these cylinders due to the fact that they have different sections. This increase in pressure thus generates an increase in the tilt of the plate to increase the flow rate of the pump. In other words, the tilt of the plate 34 relative to a plane normal to the axis AP is all the greater as the supply pressure of the cylinders 47 and 48 is high.

Figure 5:
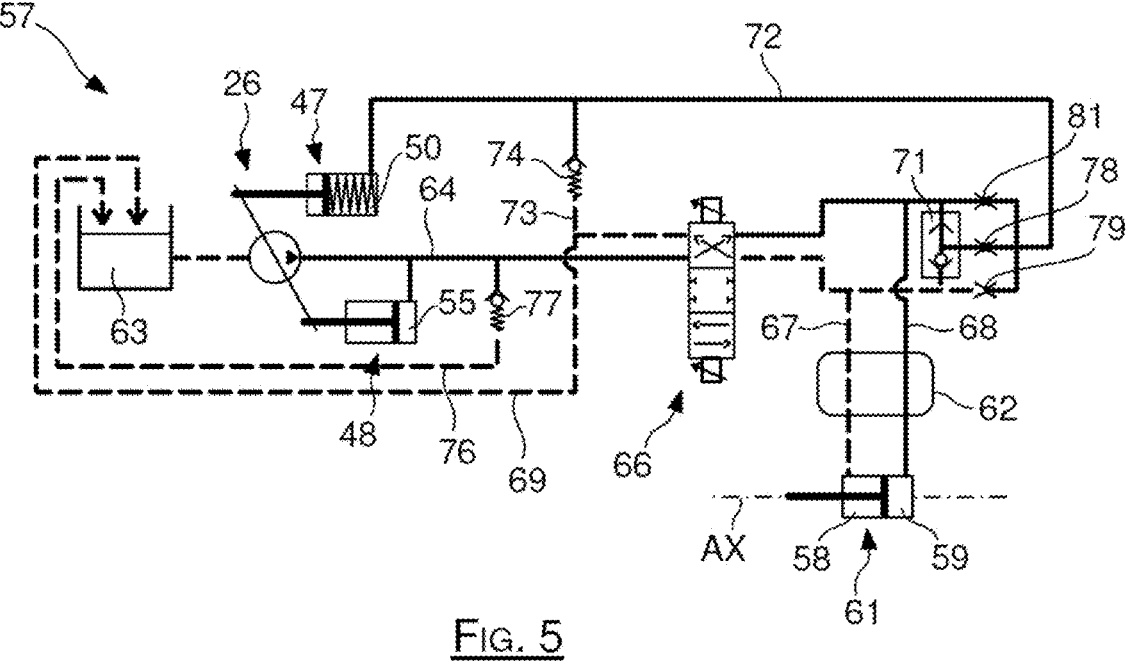
FIG. 5 is a schematic view of the control circuit according to the invention when the dispensing valve thereof occupies a first position.

The variable-displacement axial piston pump 26 is integrated into the control circuit 57 represented in FIG. 5, to ensure the pressurisation of the upstream chamber 58 or the downstream chamber 59 of a cylinder 61 acting on the longitudinal position of a central shaft of a motor. This allows maintaining the vanes at a predetermined setting angle by maintaining this shaft at a given position and changing the setting angle of these vanes by moving this shaft.

This cylinder 61 is carried by the central shaft which rotates while being powered by the control circuit which is carried by fixed elements of the motor, thanks to a hydraulic transfer bearing 62 surrounding the central shaft, this bearing being the seat of hydraulic leaks.

As shown in FIG. 5, this circuit 57 includes an oil tank 63 which is connected to the pump 26 to supply it.

The pump 26 has the outlet thereof connected to a supply pipe 64 connected to a three-position dispensing valve 66, and the chamber 55 of the compensation cylinder 48 of the pump is pressurised to the outlet pressure by being connected to the pipe 64 by a tap.

This dispensing valve 66, which here is a dispenser drawer, is connected to a first chamber of the transfer bearing 62 via an upstream pipe 67, and this first chamber of the bearing 62 directly supplies the upstream chamber 58 of the cylinder 61. The dispensing valve 66 is connected to a second chamber of the transfer bearing 62 via a downstream pipe 68, and this second chamber of the bearing 62 directly supplies the downstream chamber 59 of the cylinder 61.

In the situation of FIG. 5, the dispensing valve 66 occupies a first position corresponding for example to a cruise flight situation, in which it connects, on the one hand, the downstream chamber 59 to the outlet of the pump 26, and on the other hand, the upstream chamber 58 to a bleed pipe 69 opening into the tank 63.

In this situation in FIG. 5, the forces exerted from upstream to downstream by the fan vanes on the rod of the cylinder 61 are compensated by the pressurisation of the downstream chamber 59, the upstream chamber 58, in turn, not being pressurised.

Additionally, the circuit 57 includes a selection valve 71 connected to the upstream pipe 67, to the downstream pipe 68, and to a control pipe 72 supplying the chamber 50 of the control cylinder 47. This selection valve 71, which here is a shuttle valve, continuously connects the control pipe 72 to the pipe having the highest pressure among the upstream pipe 67 and the downstream pipe 68.

Thanks to the selection valve 71 and the control pipe 72, the pressure in the downstream chamber 59 is automatically adjusted to the force exerted by the blades on the rod of the cylinder 61.

More particularly, an increase in the force exerted by the vanes on the rod of the cylinder 61 tends to move this rod to retract it into the body of the cylinder, which has the effect of increasing the pressure in the downstream chamber 59 of this cylinder. This increase in pressure is reflected in the chamber 50 of the control cylinder 47, due to the fact that it is connected to this downstream chamber 59 by the selection valve 71, which causes an increase in the tilt of the plate 34 of the pump 26, which consequently increases its flow rate.

Under these conditions, the outlet flow rate of the pump 26 increases, which allows increasing the pressure in the chamber 59 to counter the increase in the force exerted by the vanes while compensating for the increase in leaks in the bearing 62 resulting from the increase in pressure.

Similarly, a reduction in the force exerted by the vanes on the cylinder 61 tends to cause the rod of the cylinder 61 to extend, resulting in a reduction in the pressure in the chamber 59. This reduction is passed on by the control cylinder, which causes a reduction in the tilt of the plate, and thereby a reduction in the flow rate of the pump resulting in a reduction in the pressure in the chamber 59 and a reduction in the losses in the bearing 62 as a result of the reduction in pressure.

As can be understood, the hydraulic control circuit 57 thus allows automatically regulating the pressure in the cylinder 61 to continually adapt it to the value of the forces exerted by the fan vanes.

Thus, the setting of the blades does not change when the forces they exert (which correspond to the aerodynamic forces they undergo) fluctuate, and the used control pressure is as low as possible since it is continually adjusted to this force. This allows limiting the consumption of the pump, and thereby optimising the efficiency of the motor.

As shown in FIG. 5, the circuit 57 also includes a bleed pipe 73 of the control pipe 72 which connects the latter to the tank 63, and which includes a check valve 74 which is here a ball valve. Thus, in the case of excessive pressure in the control pipe 72, this is immediately reduced by discharging part of the oil it contains into the tank 63, as soon as the pressure in this control pipe becomes greater than the threshold pressure of the valve 74.

Similarly, another bleed pipe 76 connects the supply pipe 64 to the tank 63, this other bleed pipe 76 also being equipped with a check valve 77 which is here a ball valve to lower the pressure of the supply pipe as soon as it becomes greater than a threshold value. This other bleed pipe 76 can be integrated directly into the pump to connect its outlet to its inlet via the check valve.

Moreover, the control pipe 72 is connected to the selection valve 71 via a restriction 78 allows to smooth out peaks or irregularities in the pressure to avoid unnecessarily disturbing the flow rate of the pump.

Similarly, this control pipe 72 is also connected to the upstream pipe 67 by a restriction 79, and it is also connected to the downstream pipe 68 by another restriction 81.

These two other restrictions also help to smooth out pressure peaks or irregularities in the circuit, so as to avoid unnecessarily jerky behaviour of the pump control.

Figure 6:
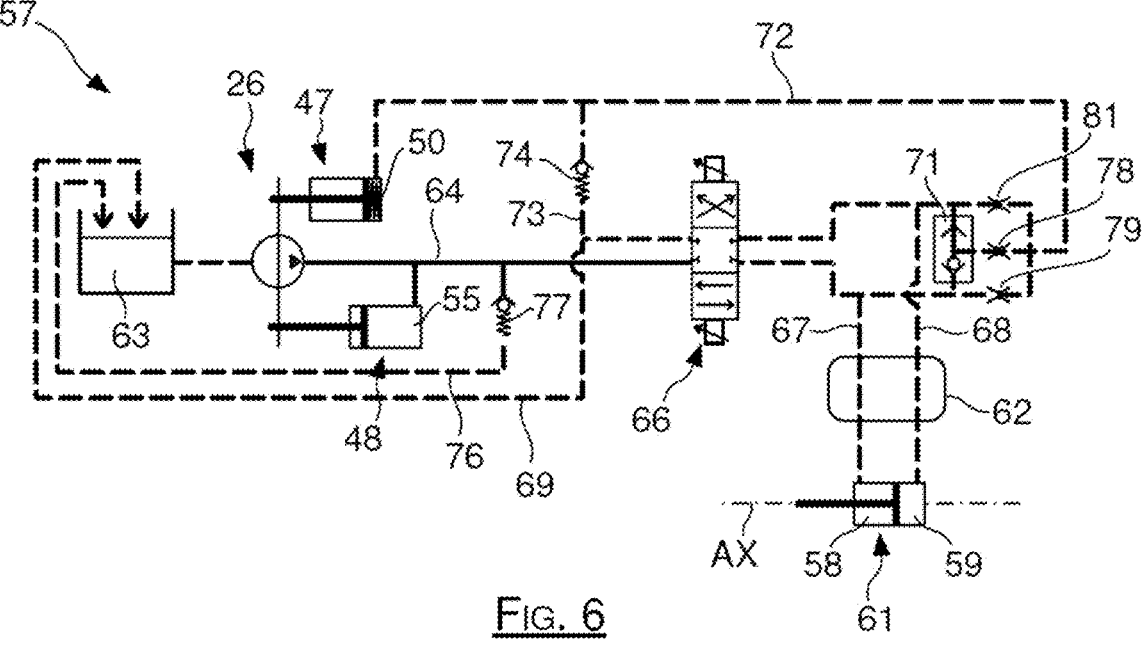
FIG. 6 is a schematic view of the control circuit according to the invention when the dispensing valve thereof occupies a second position.

The dispensing valve 66 which occupies a first position in the configuration of FIG. 5 can also occupy a second position corresponding to its configuration in FIG. 6, and in which it closes all communication between the supply pipe 64 and the cylinder 61, and any communication between the bleed pipe 69 and the cylinder 61.

When the dispensing valve 66 is switched from its first position to its second position, the pressures gradually balance in the upstream pipe 67, in the downstream pipe 68 and in the control pipe 72, due to the restrictions 78, 79 and 81 by which these pipes communicate.

Under these conditions, the pressure in the control chamber 50 of the cylinder 47 decreases sharply, such that the plate 34 of the pump is balanced at an angular position close to normal to the axis AP, the pump 26 then having a substantially zero flow rate which compensates for the circuit leaks.

Taking into account in particular the presence of the restrictions 79 and 81, in this situation, the cylinder 61 is not blocked, but on the contrary it is likely to be moved at a relatively slow speed when forces are applied thereto.

The dispensing valve can still occupy a third position, corresponding to the situation illustrated in FIG. 7. This third position is similar to its first position, except that the supply to the cylinder 61 is then reversed: it is the upstream chamber 58 thereof which is pressurised to the supply pressure exiting the pump, and the downstream chamber 59 thereof is connected to the bleed 69 to have a substantially zero pressure.

This third position of the dispensing valve can correspond to a situation in which the forces are applied by the vanes on the cylinder in the opposite direction to the case of FIG. 5. In other words, in this case the cylinder is regulated to exert a force from upstream to downstream in order to oppose the force exerted by the vanes which is then oriented from downstream to upstream.

The control circuit has been described for an operation ensuring that the vanes are maintained at a given setting angle including when the forces undergone and exerted by these vanes fluctuate, while generating a minimum pressure, that is to say necessary and sufficient to ensure they remain in the given position.

This control circuit 57 also allows changing the setting angle of the vanes. More particularly, the dispensing valve 66 which has been described schematically according to an "all-or-nothing" type operation is advantageously a progressive type valve to suit a concrete application.

When this valve 66 is in its first position, it can further be controlled to provide the fluid with a more or less large passage section. If it is controlled to offer a maximum passage section, the entire flow delivered by the pump is transferred to the chamber 59, such that the pressure in this chamber reaches a value which is greater than that necessary to balance the force exerted by the vanes, which causes a movement of the cylinder which is deployed, thereby modifying the setting angle of the blades.

In the first position, if the valve is controlled to offer the fluid a partial passage section, corresponding to a predetermined value, the flow rate transferred to the chamber 59 is lower, to generate in the chamber 59 a pressure value which can be provided just sufficient to balance the forces exerted by the vanes, so as to only ensure their maintenance at the setting angle that they occupy.

Similarly, when the valve occupies the third position, it can also be controlled to offer the fluid a more or less large passage section, so as to, depending on the case, generate a pressure which is greater than the balancing pressure in the chamber 58 to retract the cylinder, or even a pressure corresponding to the balancing pressure to ensure that the blades are maintained at the setting angle they occupy.

Controlling and driving the dispensing valve are ensured from a motor computer (Fadec) which continually adjusts the signals sent to this valve depending on the motor operating conditions.

In the example of FIGS. 3 to 7, the tilt of the plate 34 of the pump 26 is ensured by a control cylinder 47 of the single-acting type, and by a compensation cylinder 48 of smaller section which is also of the single-acting type.

Instead of being located in cylinders, the control chamber and the compensation chamber can also be located in a space delimited by a substantially cylindrical casing surrounding the plate while being closed by a bottom and an inner separating wall. The separating wall then extends along a plane passing through the axes AP and AR to separate the control chamber and the compensation chamber, this inner wall being able to be formed in two portions extending on either side of the shaft 27.

The plate can then have a less extensive useful surface on the side of the compensation chamber than on the side of the control chamber in order to tilt when the two chambers are pressurised to the same pressure. To do this, the plate can have a generally circular outline, but having a rectilinear flat surface parallel to the axis AP on the side of the compensation chamber. The generally cylindrical casing then has a corresponding flat surface, and a seal carried by the periphery of the plate then ensures a sealing with the casing.

The control and compensation functions can also be ensured with the same double-acting control and compensation cylinder 82 including the control chamber 50 and the compensation chamber 55, located in the same position as the control cylinder 47 of FIG. 5, as schematically illustrated in FIG. 8.

In this case, the control chamber 50 which integrates the return spring 52 is located on the side opposite the rod of the cylinder 82 while the compensation chamber 55 is crossed by this rod. This compensation chamber 55 thus has a useful section which is smaller than that of the control chamber 50, the difference in useful section of the two chambers corresponding to the section of the rod.

Generally speaking, the invention allows regulating the back pressure of the variable-displacement axial piston pump with a pressure which depends on the forces applied to the blade setting control cylinder, instead of regulating it at a high fixed value. It was explained in the context of controlling variable-setting fan blades of a turbojet engine, but it can be applied to the system for controlling variable-setting blades of other types of motors such as turboprop engines.

The invention claimed is:

1. A hydraulic control circuit of a double-acting orientation cylinder to orient fan blades of a turbojet engine, comprising an oil tank, a variable-displacement axial piston pump including a swash plate as well as a control chamber and a compensation chamber, the tilt of the plate being controlled by pressurising these chambers, the pump being supplied by the tank and having the outlet thereof configured to be able to be connected by a supply pipe to one of the chambers of the orientation cylinder, the other chamber of the orientation cylinder being connected to the tank, the control chamber and the compensation chamber both being pressurised with a pressure corresponding to the pump outlet pressure, the control chamber and the compensation chamber being arranged to increase the tilt of the plate in order to increase the displacement of the pump when the pressurisation pressure of these chambers increases, wherein the pump has the outlet thereof connected to a dispensing valve via the supply pipe, wherein the compensation chamber of the pump is supplied by the output of the pump, wherein the two chambers of the orientation cylinder are connected to the dispensing valve, wherein the dispensing valve can occupy a position in which it connects one of the chambers to the supply pipe and the other chamber to the tank, or another position in which it connects one of the chamber to the tank and the other chamber to the supply pipe, the circuit further comprising a selection valve connected to the two chambers of the orientation cylinder and to the control chamber via a control pipe, to pressurise the control chamber of the pump with the highest pressure among the two chambers of the orientation cylinder.

2. The circuit according to claim 1, comprising a control cylinder including the control chamber, and a compensation cylinder including the compensation chamber, the control cylinder and the compensation cylinder being distinct.

3. The circuit according to claim 1, comprising a double-acting control and compensation cylinder integrating the control chamber and the compensation chamber.

4. The circuit according to claim 1, wherein the control pipe is connected to the two chambers by additional conduits provided with restrictions, and wherein the dispensing valve can occupy a position in which the pump and the tank are isolated from the two chambers of the orientation cylinder.

5. The circuit according to claim 1, comprising a bleed pipe connecting the supply pipe to the tank via a check valve.

6. The circuit according to claim 1, comprising a bleed pipe connecting the control pipe to the tank via a check valve.

7. The circuit according to claim 1, wherein the control chamber has a larger section than the compensation chamber.

8. The circuit according to claim 1, wherein the control chamber incorporates a spring tending to deploy the cylinder.

9. A turbojet engine comprising a circuit according to claim 1 and variable-setting fan blades which are controlled by this circuit.

* * * * *